Aug. 21, 1956  E. B. NOLT  2,759,323
BALER DISCHARGE CHUTE
Original Filed Sept. 6, 1950  2 Sheets-Sheet 1

Inventor:
Edwin B. Nolt
By Richard E. Babcock Jr.
Attorney

Aug. 21, 1956
E. B. NOLT
2,759,323
BALER DISCHARGE CHUTE
Original Filed Sept. 6, 1950
2 Sheets-Sheet 2
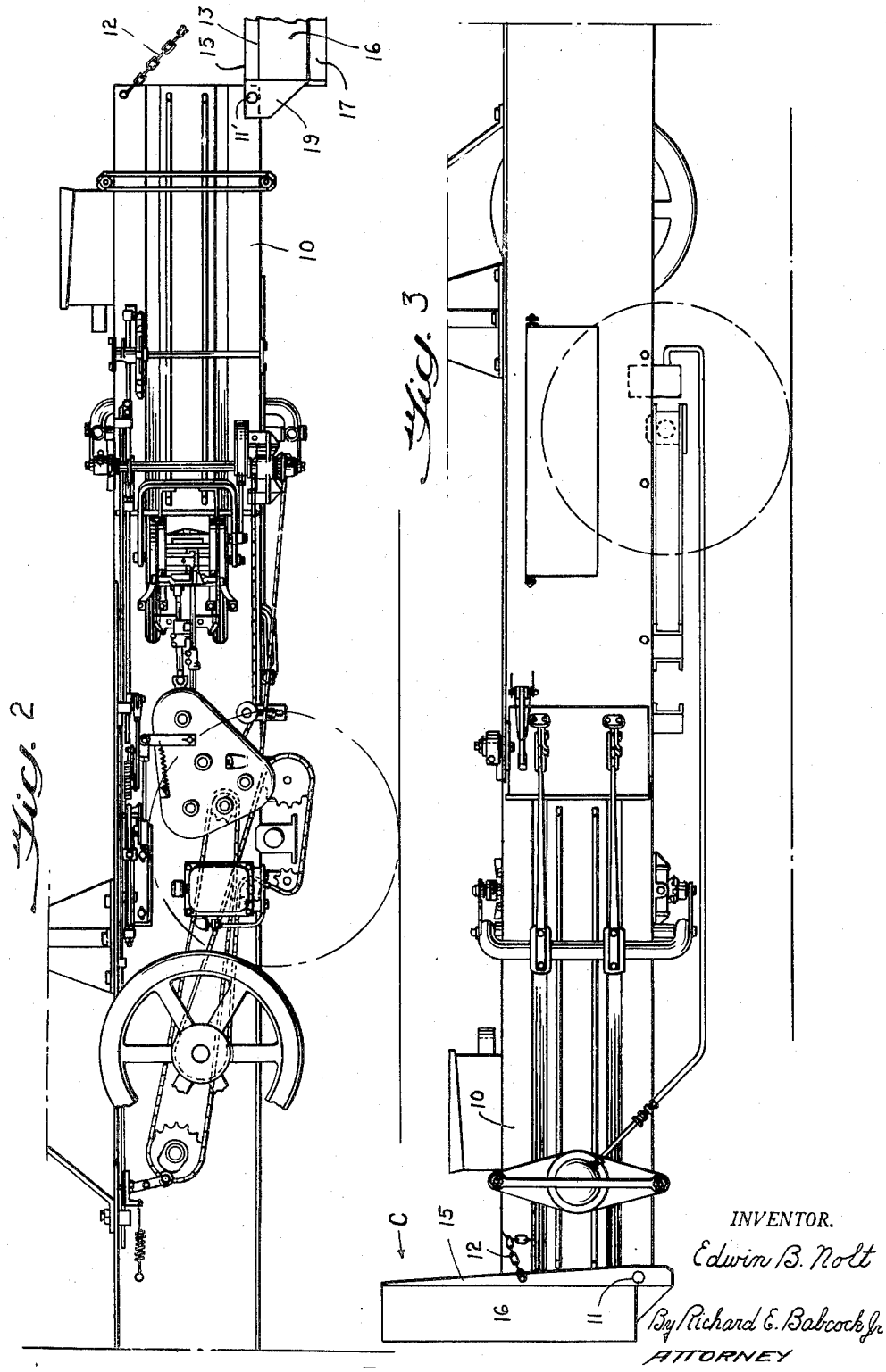
INVENTOR.
Edwin B. Nolt
By Richard E. Babcock Jr.
ATTORNEY though of course, the form is immaterial to the essential nature of the invention.

United States Patent Office 2,759,323
Patented Aug. 21, 1956

2,759,323

BALER DISCHARGE CHUTE

Edwin B. Nolt, New Holland, Pa., assignor to Sperry Rand Corporation, New Holland, Pa., a corporation of Delaware Original application September 6, 1950, Serial No. 183,321. Divided and this application November 26, 1952, Serial No. 322,716

6 Claims. (Cl. 56—473.5)

This invention relates to a baler discharge chute for use with an automatic hay baler of the type which is adapted to be moved through a field to automatically lift hay from the stubble, compress it into a bale, and form and tie bands around the bales with either twine or a wire.

It is a primary object of the invention to provide a new form of outfeed or discharge chute for dropping the completed bales onto the ground with a rolling motion so that they come to rest in the field in a position out of the way of the baler when making the next succeeding path through the field.

In accordance with the invention, as the completed bales issuing from the bale chamber are pushed along the chamber against the frictional contact of the walls of the chamber as succeeding bales are being formed, the finished bales are delivered out of the end of the compression chamber or bale chamber onto the discharge chute, which has a relatively narrow ledge formed thereon to partially support the rearwardly extending end of each of the bales as the bales issue serially from the chamber, while the front end of each such bale is held in the baling chamber. As soon as the bale is ejected in its entirety from the chamber, it slides rearwardly on the ledge for a few inches and then, since the ledge is not wide enough to support the bale it rolls down over the side of the ledge onto a sloping surface. The sloping surface, together with the ledge are about as wide as the bottom side of the bale and the sloping surface has a tripping flange at its lower side which engages the lower side edge of the bale as it falls onto the surface to give it a flip as it passes downwardly off of the sloping surface whereby to produce a rolling motion in the bale as it leaves the outlet chute. The bales then fall onto the ground as they are issued from the chamber and roll over a time or two, to be displaced well to the left looking forwardly along the path through which the baler is moving. This rolling motion is produced in the bales so that they will roll away from the baler and as it makes its next pass through the field, the bales will be deposited in the field out of the path of the baler so that the baler can freely move along the next windrow to pick up all of the hay without requiring movement of any of the previously formed bales before the second pass can be made.

A baler discharge chute embodying the improved features of the invention and applied to a baler in accordance with the invention, is illustrated in the accompanying drawings, in which:

Figure 2 represents a side elevation of the structure of Figure 1, as seen from the left hand or far side thereof, the free end portion of the discharge chute being broken away.

Figure 3 represents a side elevation taken from the opposite side as regards Figure 2, the baler discharge chute in this view being shown in its upwardly swung inoperative position.

Figure 1:
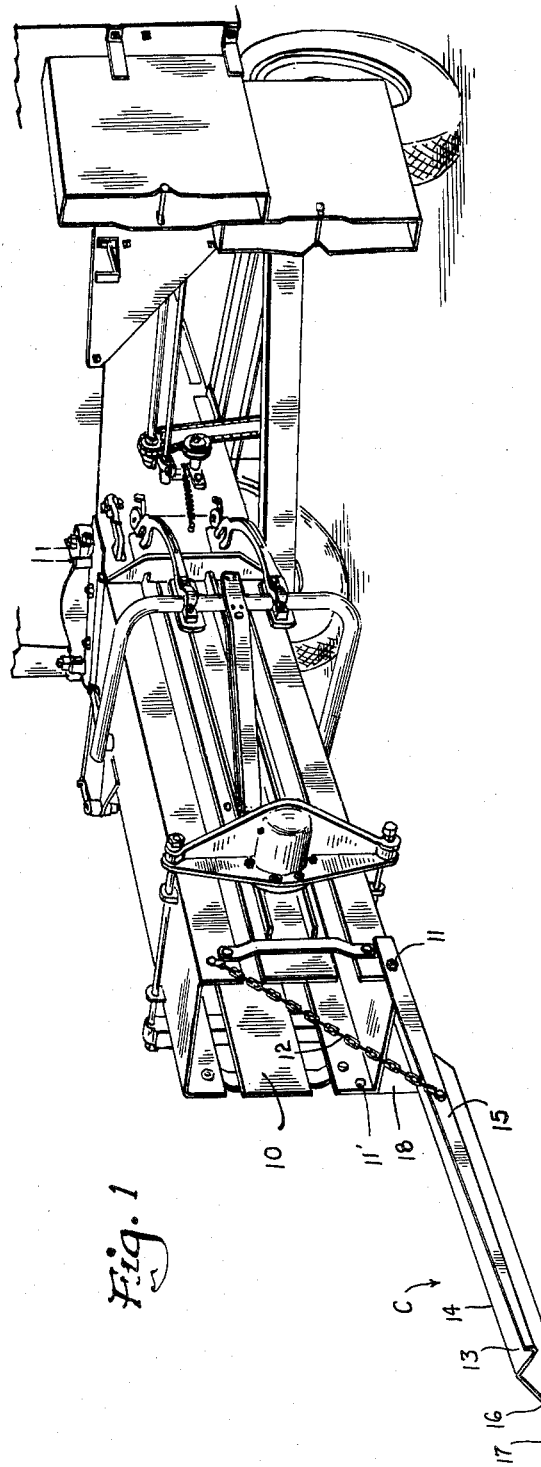
Figure 1 represents a perspective view of the rear end portion of a hay baler having the discharge chute of my invention operatively applied to the discharge end of the bale chamber.

Referring now in detail to the accompanying drawings, I have illustrated my invention as applied to an automatic pick-up hay baler, the details of which are fully shown and described in my copending application Serial No. 183,321, filed September 6, 1950, of which this is a division. Such a hay baler is of the wheeled type adapted to be moved through a hay field and has a conventional pick-up (not shown) which will be located at the right-hand side of the baler as seen in Figure 1. From the pick-up, the hay is delivered into a bale chamber 10, which may be of rectangular cross-section extending lengthwise in the direction of travel of the baler. The hay is compressed into bales in the bale chamber by a usual reciprocating plunger or the like, the bales being banded and then successively expelled rearwardly from the bale chamber onto the bale discharge chute of the invention, designated C in its entirety.

Discharge chute C is of a type which may be economically formed of integral sheet metal construction, and is preferably pivotally connected to the bale chamber, as at 11—11' for adjustment about a horizontal axis.

When operatively positioned to receive and discharge bales issuing from the adjoining end of the bale casing or chamber, the chute C is swung downwardly to a horizontal position, as in Figures 1 and 2, and supported by means such as the chain 12 connected between the upper corner of the bale casing and the chute. During transport of the baler, the chute may be swung upwardly to an out of the way vertical position, as in Figure 3, and held in such position by the chain 12, the connection of which to the bale casing is adjusted accordingly.

The chute C includes an elongated flat ledge 13 which is supported at substantially the level of the bale chamber floor or bottom to receive the completed bales as they issue serially from the bale chamber, the ledge having a width less than one-half of the bale chamber or the bales, so that upon being fully received on the ledge 13, the bales will be unbalanced and will tend to topple over along the inner longitudinal edge or shoulder 14 of the chute.

In order to guide the bales along the chute C to insure their thus becoming unbalanced and toppling over the inner edge or shoulder 14, an upturned longitudinal flange 15 may be formed along the outer edge of the chute C in substantial alignment with the adjoining side wall of the bale casing or chamber 10.

Sloping transversely downwardly from the longitudinal edge or shoulder 14, of the ledge 13 is a preferably integral section 16 of the chute defining a sloping surface longitudinally adjoining said ledge. The section or surface 16 in the present instance constitutes an integral portion of the chute C, being merely bent downwardly relative to the ledge 13 along a fold line coincident with the inner edge 14 of the ledge. It will be apparent that the bales toppling or rolling laterally off the ledge 13 will be received on and will roll laterally down the sloping surface 16. It will be noted that the surface 16 slopes to the left or away from the pick-up of the baler so that the bales will tend to roll away from the pick-up side of the baler.

Disposed along the longitudinal lower edge of the sloping surface or section 16 is a tripping means which may comprise an integral upwardly bent flange 17 disposed to engage each falling bale to produce a rolling motion in each of the bales as they fall from the ledge 13. Preferably the tripping flange 17 is so located as to extend around the lower left hand corner of each of the falling bales to function somewhat in the manner of a hook.

In order to transversly stiffen the chute C, same may be provided with an end wall 18 at its forward end fixed to the sloping section 16. A rearwardly bent and upwardly projecting tab or ear 19, shown in Figure 2, provides means for pivotally connecting this left side of the chute to the bale chamber, as at 11'.

In the operation of the invention, as the completed bale issues step by step out of the end of the chamber 10, it is supported at its rear end on the ledge 13 of the out feed chute. When the baler is in operation, the out feed chute is lowered to the position shown in Figures 1 and 2 so that the ledge 13 forms in effect a continuation of the floor of the compression chamber 10.

The compressed bales are supported by the engagement of their front ends in the bale chamber and their rear ends move along ledge 13 during the time when the bale is being forced out of the chamber by successive strokes of the compressing plunger. After the bale has been pushed entirely out of the bale chamber, it is supported for a moment on the ledge 13, which has a width somewhat less than the width of the bottom side of the bale so that the bale tends to fall down on to the sloping surface 16 formed integral with the out feed chute. As the bale balances over the edge or shoulder 14 between ledge 13 and the surface 16, a rolling action is produced so that when the bale hits the tripping flange 17 located at the bottom of surface 16, this flange preferably hooks around the lower left-hand corner of the bale as seen from the rear end or discharge end of the baler and the bale is thus flipped over so that it will turn over several times upon rolling out onto the ground.

The production of this rolling action in the discharged bale is of particular advantage in that when the bale is thus dropped onto the ground it rolls laterally away from the baler so as to be well out of the path through which the baler moves in making the next pass around the field. In using an outfeed or discharge chute as shown, it is quite practical for the baler to follow the spiral or other closely spaced windrows produced in the usual hay field and to drop the bales in the field without first picking up the bales made during the preceding pass of the machine around the field or requiring that they be moved out of the path of the baler.

Having thus described my invention, I claim:

1. A hay baler discharge chute comprising an elongated substantially horizontal ledge having a rectilinear longitudinal edge, means defining a sloping surface immediately adjoining said ledge along said longitudinal edge thereof, said sloping surface being inclined transversely downwardly from its juncture with said edge, a tripping flange being fixed on and projecting upwardly from the lower side of said sloping surface to a level below the center of gravity of a bale supported on said surface and in transversely opposed parallel relationship to said edge.

2. A hay baler discharge chute comprising an elongated substantially horizontal ledge having a straight longitudinal edge, an upstanding guide flange fixed on said ledge parallel to said longitudinal edge, and a generally horizontal tripping means supported below and parallel to said longitudinal edge in laterally spaced laterally opposed relation thereto.

3. A hay baler discharge chute comprising an elongated substantially horizontal ledge having a straight longitudinal edge, a tripping means and means supporting said tripping means in a horizontal plane below and parallel to said longitudinal edge in laterally spaced transversely opposed relation thereto.

4. A discharge chute for producing a rolling motion in bales issuing from the bale chamber of a hay baler comprising an elongated substantially horizontal ledge in longitudinal alignment with the bale chamber and lying wholly on one side of the major axis of said chamber, said ledge having an inner edge adjacent and parallel to said major axis, and a tripping means longitudinally aligned with said chamber and lying wholly on the other side of said major longitudinal axis at a level below said ledge, and transversely opposed thereto.

5. The combination of claim 4 including means defining a sloping surface inclined transversely downwardly from said inner edge, said tripping means comprising a flange projecting upwardly from said sloping surface is spaced parallel relation to said inner edge, said flange projecting above said sloping surface, a distance equal to less than half of the height of said bale chamber.

6. The combination of claim 4 comprising a guide flange projecting upwardly along one marginal edge of said ledge remote from said major axis of the bale chamber and in longitudinal alignment with a side wall of said bale chamber.

References Cited in the file of this patent

UNITED STATES PATENTS

| | | |
|---|---|---|
| 1,496,364 | Bonnafoux | June 3, 1924 |
| 1,588,681 | Haney | June 15, 1926 |
| 2,529,842 | Jones et al. | Nov. 14, 1950 |
| 2,649,945 | McClellan | Aug. 25, 1953 |

FOREIGN PATENTS

| | | |
|---|---|---|
| 871,420 | France | Jan. 15, 1942 |